United States Patent [19]

Link

[11] 3,946,471

[45] Mar. 30, 1976

[54] MEANS FOR MOVING RECIPROCABLE CARRIAGES FOR INDEXIBLE TOOL TURRETS IN MACHINE TOOLS

[75] Inventor: Helmut Link, Schanbach, Germany

[73] Assignee: Index-Werke KG Hahn & Tessky, Esslingen, Germany

[22] Filed: Sept. 12, 1974

[21] Appl. No.: 505,603

[30] Foreign Application Priority Data

Sept. 14, 1973 Germany............................ 2346369

[52] U.S. Cl...................... 29/44; 29/35.5; 82/21 R
[51] Int. Cl.² ........................................... B23B 7/04
[58] Field of Search........... 29/44, 45, 48.5 R, 35.5; 82/21 A, 21 R; 192/3 N; 74/826, 822, 813 C

[56] References Cited
UNITED STATES PATENTS

| | | | |
|---|---|---|---|
| 2,870,656 | 1/1959 | Bechler................................ | 74/822 |
| 3,060,466 | 10/1962 | Kozacka ............................. | 10/128 |
| 3,481,231 | 12/1969 | Cormier................................ | 82/21 |
| 3,492,897 | 2/1970 | Cunningham et al.................. | 82/21 |
| 3,590,965 | 7/1971 | Oppenheimer ........................ | 192/3 |
| 3,593,597 | 7/1971 | Jennings ............................ | 74/826 X |
| 3,690,201 | 9/1972 | Link................................... | 82/24 R |

Primary Examiner—Travis S. McGehee
Assistant Examiner—W. R. Briggs
Attorney, Agent, or Firm—Michael J. Striker

[57] ABSTRACT

An automatic lathe wherein the carriage for an indexible tool turret is biased against a stop and can be moved toward the work spindle by a rotary cam which is driven by a hydraulic motor and is arrested by a hydraulic brake when the carriage reaches a selected position. The motor is automatically decelerated to crawling speed prior to complete stoppage of the cam and the brake is applied subsequent to deceleration of the motor and simultaneously with opening of an arresting valve which connects the supply and return conduits for the motor. The supply conduit continues to receive some pressurized fluid while the motor is at a standstill. Abrupt acceleration of the motor is prevented by maintaining the arresting valve in open position after a motor valve increases the rate of fluid flow from a pump to the supply conduit and by closing the arresting valve simultaneously with disengagement of the brake.

20 Claims, 3 Drawing Figures

MEANS FOR MOVING RECIPROCABLE CARRIAGES FOR INDEXIBLE TOOL TURRETS IN MACHINE TOOLS

BACKGROUND OF THE INVENTION

The present invention relates to machine tools in general, and more particularly to improvements in automatic machine tools including turret lathes and analogous machines wherein a reciprocable carriage is movable from a first or retracted position to a plurality of different second positions to thereby place a selected tool thereon into an optimum position for treatment of a workpiece which is rotated by a work spindle.

It is known to employ in an automatic lathe a carriage which is reciprocable toward and away from the workpiece in the work gripping means of a rotary spindle and which supports an indexible tool turret. It is also known to utilize springs or other biasing means for permanently urging the carriage to its retracted or first position as well as to employ an apparatus which can advance the carriage toward the workpiece so that the carriage can come to rest in any one of several second or operative positions. In certain machine tools, the apparatus comprises a cam which is driven by a variable-speed motor and can transmit motion to the carriage through the medium of a suitable follower system. It is further known to control the motor by a programming unit which can also initiate the actuation of a braking device to thus insure that the carriage will dwell in a selected second position while the respective tool removes material from the workpiece.

Since the carriage is movable forwardly exclusively by means of a cam, the machine tool must be equipped with reliable means for automatically arresting the carriage in a selected second position. The provision of such arresting means is of particular importance when the workpiece which rotates with the work spindle is to be treated by one or more tools which are mounted on the reciprocable carriage as well by one or more tools which are mounted on one or more cross slides. Stoppage of the carriage in an accurately determined position is essential when the workpiece is to be treated, in rapid sequence, first by a tool on a cross slide, thereupon by one or more tools on the carriage (e.g., on the aforementioned indexible turret which is mounted on the carriage), and thereupon again by one or more tools on a cross slide. For example, the control system of the machine must prevent a collision between the carriage and a cross slide when, following a treatment by one or more tools on the carriage, the workpiece is to be treated by a tool on the cross slide which must move relative to the carriage in order that the tool can form a cavity or recess. The situation is analogous during a change in setup, i.e., when the turret and the cross slide or cross slides are to be equipped with different tools and the persons in charge must select the extent and sequence of movements of carriage and cross slide(s). It is important in such machine tools to insure that the carriage will not overshoot its intended position, even if it is initially moved at a very high speed, as well as that a selected tool can remain in selected position without any drifting for extended periods of time. Moreover, it is desirable to insure that the carriage can leave its first or starting position without jerking or abrupt acceleration because such movement can take place while a tool on the turret is in material-removing contact with the workpiece in the revolving work spindle.

In accordance with a presently known proposal, the cam which moves the carriage forwardly is driven by a variable-speed D.C. motor which transmits motion to the cam through the medium of a two-stage gear transmission including one or more clutches and a braking device. Such machine tools further comprise a reversible multi-phase braking motor whereby the cam can receive motion from the braking motor alone, from the D.C. motor alone, or from both motors. In the latter instance, the two motors drive the cam by way of a planetary transmission. The means for selecting the operation of the drive (i.e., whether the cam is to be rotated by the one, the other or both motors) in dependency on the desired speed of forward movement of the carriage comprises a suitable programming drum with adjustable output elements in the form of angularly displaceable lobes or the like. Reference may be had to German Offenlegungsschrift No. 1,777,070.

The just described electromechanical drive for the cam exhibits a number of serious drawbacks. Thus, the overall cost of the drive (with two motors, one or more clutches, a braking device and a complex transmission) is very high. Furthermore, the control equipment which is needed to regulate the operation of such drive is so complex and bulky that it cannot be installed in or on the frame of the machine tool, i.e., it must be installed in a separate cabinet. The control equipment includes a host of relays, switches and other electronic and electrical components.

SUMMARY OF THE INVENTION

An object of the invention is to provide a machine tool, especially an automatic turret lathe, with a novel and improved apparatus for moving a reciprocable tool carriage with respect to the workpiece.

Another object of the invention is to provide an apparatus which is simpler, more compact, more rugged, longer-lasting and less expensive than heretofore known apparatus, and which can be installed in existing machine tools.

A further object of the invention is to provide an apparatus which can move the carriage at a plurality of speeds by resorting to a single and relatively simple prime mover, which can repeatedly move the carriage to any one of a large number of different operative positions with a highly satisfactory degree of reproducibility, and which is sufficiently compact to be installed directly in or on the frame of or integrated into the machine tool.

An additional object of the invention is to provide a machine tool wherein the reciprocable carriage for an indexible tool turret can be accelerated at a desired rate and wherein the regulation of motor speed and stoppage of the motor and cam can be effected by resorting to a small number of simple and inexpensive components.

The invention is embodied in a machine tool, such as an automatic turret lathe, which comprises a support (e.g., the base or bed of the machine frame), a carriage which is reciprocable along the support from a first position to any one of a plurality of second or operative positions, means for biasing the carriage to the first position, and apparatus for advancing the carriage to a selected second position. The advancing apparatus comprises a movable (preferably rotary) cam, follower means which tracks the cam and serves to move the carriage from the first position in response to movement of the cam from a starting position, a rotary fluid power motor which is operable at a plurality of speeds, means (e.g., a gear train) for moving the cam in response to rotation of the motor, a fluid operated braking device for arresting the cam (e.g., through the medium of the gear train) in a selected second position of the carriage, a preferably rotary programming device which receives motion from the motor (e.g., through the medium of a second gear train which is driven by the first mentioned gear train) and has a plurality of angularly distributed protuberances or analogous output elements, and regulating means including a plurality of mobile input elements (e.g., trips mounted on pivotable levers) each of which can receive motion from a different output element in respective preselected angular positions of the programming device. The regulating means further includes first and second valves for respectively controlling the speed of the motor and the operation of the braking device, first displacing means (e.g., a pivotable lever) which is movable in response to movement of any one of the input elements to thereby actuate the first valve so as to reduce the speed of the motor, second displacing means for actuating the second valve with a delay following the movement of any one of the input elements to thereby operate the braking device while the motor rotates at the reduced speed, a third valve or other suitable means for arresting the motor substantially simultaneously with operation of the braking device, and fluid-operated resetting means (e.g., two reciprocable plungers) for normally maintaining the two valves in conditions corresponding to an elevated speed of the motor and an inoperative condition of the braking device.

The machine tool may comprise a rotary tool turret which is mounted on and is indexible with respect to the carriage and a plurality of projections in the form of studs or the like which are provided on the carriage and are indexible in response to indexing of the turret (or vice versa) so that a different projection can receive motion from the follower means and transmit such motion to the carriage in each angular position of the turret. The motor is preferably a hydraulic motor and the braking device is preferably operated by hydraulic fluid (this braking device may comprise a cylinder block, a piston in the cylinder block, and a spring which urges the piston to one end position in which the braking device is operative). The second valve is actuatable to move the piston to a second position in which the braking device is inoperative whenever the motor rotates to move the cam.

The regulating means preferably further comprises a source of pressurized hydraulic fluid, a reservoir or tank, a first conduit (supply conduit) for connecting the source with the motor, and a second conduit for connecting the motor with the tank. The first valve preferably comprises a valve member which is installed in and can control the flow of fluid through the conduits and the arresting means preferably comprises a normally closed third valve which is connected between the two conduits and means (e.g., an extension of the aforementioned piston of the braking device) for opening the third valve in response to operation of the braking device so that the motor does not receive pressurized fluid as long as the braking device is applied.

In accordance with a further advantageous feature of the invention, the resetting means comprises a member (e.g., one of the aforementioned plungers) which can reset the first valve to a condition corresponding to operation of the motor at an elevated speed while the second valve still maintains the braking device in operative condition and while the third valve is open. This insures that the motor can be started gradually in response to deactivation of the braking device and in response to resulting closing of the third valve.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
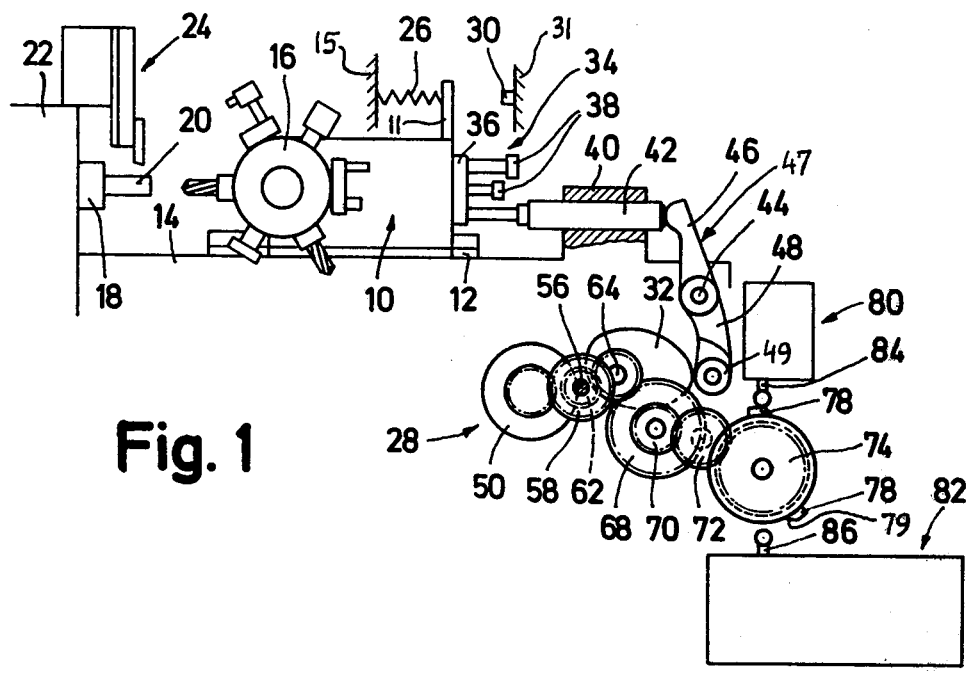
FIG. 1 is a schematic fragmentary partly side elevational and partly sectional view of an automatic turret lathe which embodies the invention.

FIG. 1 shows a portion of an automatic horizontal turret lathe having a base or support 14 provided with guide means or ways 12 for a reciprocable tool carriage 10. A headstock 22 extends upwardly from the base 14 and mounts a rotary spindle 18 for a workpiece 20. The headstock 22 supports a cross slide 24 which is movable substantially radially of the axis of the work spindle 18. The ways 12 are parallel to the axis of the work spindle 18, and the carriage 10 supports an indexible turret 16 with mounts for six tool holders. The axis about which the turret 16 is indexible with respect to the carriage 10 is horizontal and extends at right angles to the axis of the work spindle 18. When the machine tool is in use, the turret 16 can be indexed seriatim through sixty degrees or a multiple of sixty degrees so as to place the tools in successive or selected holders into an optimum position for removal of material from the workpiece 20 which rotates with the spindle 18.

The carriage 10 is permanently urged in a direction away from the work spindle 18 by a biasing device here shown schematically as a prestressed helical spring 26 which reacts against a stationary portion 15 of the machine frame and bears against an extension 11 of the carriage.

The apparatus which is utilized to advance the carriage 10 forwardly toward the work spindle 18 against the opposition of the biasing means 26 is shown at 28. When the apparatus 28 permits the biasing means 26 to move the carriage 10 away from the work spindle 18, the carriage comes to rest in a first position which is determined by a preferably adjustable stop 30 on a frame member 31. The apparatus 28 comprises a single rotary cam 32 here shown as a disk cam whose periphery is tracked by a roller 49 mounted on the arm 48 of a two-armed follower lever 47 which is fulcrumed at 44. The other arm 46 of the follower lever 47 abuts against the rear end of a reciprocable pusher or plunger 42 which is movable in a stationary guide 40 of the machine frame and the front end of which can engage and displace one of several projections or studs 38 forming part of a selector unit 34 which is mounted on the carriage 10 and cooperates with the indexing mechanism (not shown) for the turret 16. The studs 38 are mounted on an indexible support 36 which is mounted directly on the rear end portion of the carriage 10. The number of studs 38 equals the number of tool holders on the turret 16 and their angular spacing is the same as that of the tool holders. The effective length of the studs 38 is adjustable and such effective length depends on the extent to which the corresponding tool on the turret 16 is to be moved toward the workpiece 20 in the clamping device of the work spindle 18. When the turret 16 is indexed with respect to the carriage 10, the support 36 is also indexed through the same angle so as to place the appropriate stud 38 into register with the forward end of the pusher 42 in the guide 40. The biasing means 26 insures that the stud 38 which registers with the pusher 42 invariably abuts against the front end of this pusher during forward movement of the carriage 10 toward the workpiece 20. An indexing mechanism which can be used to change the angular position of the turret 16 is disclosed, for example, in the commonly owned U.S. Pat. No. 3,690,201 granted Sept. 12, 1972.

Figure 2:
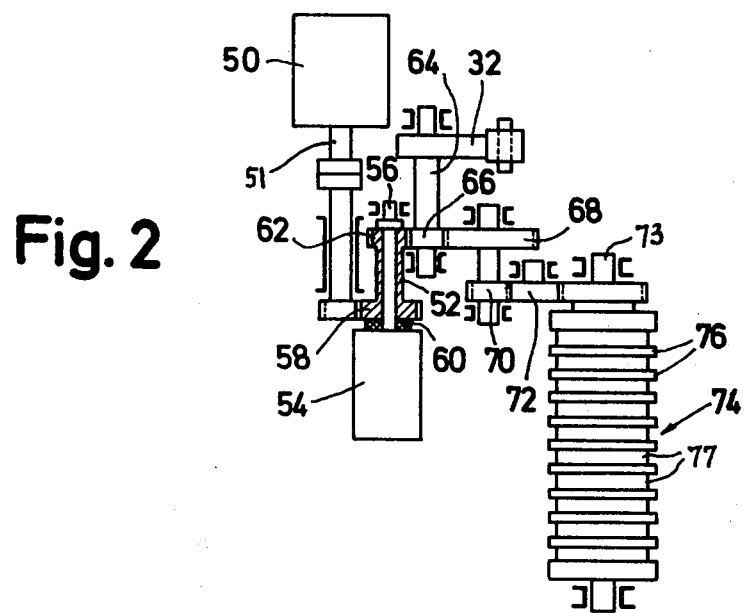
FIG. 2 is a schematic plan view of a portion of the structure shown in FIG. 1.
Figure 3:
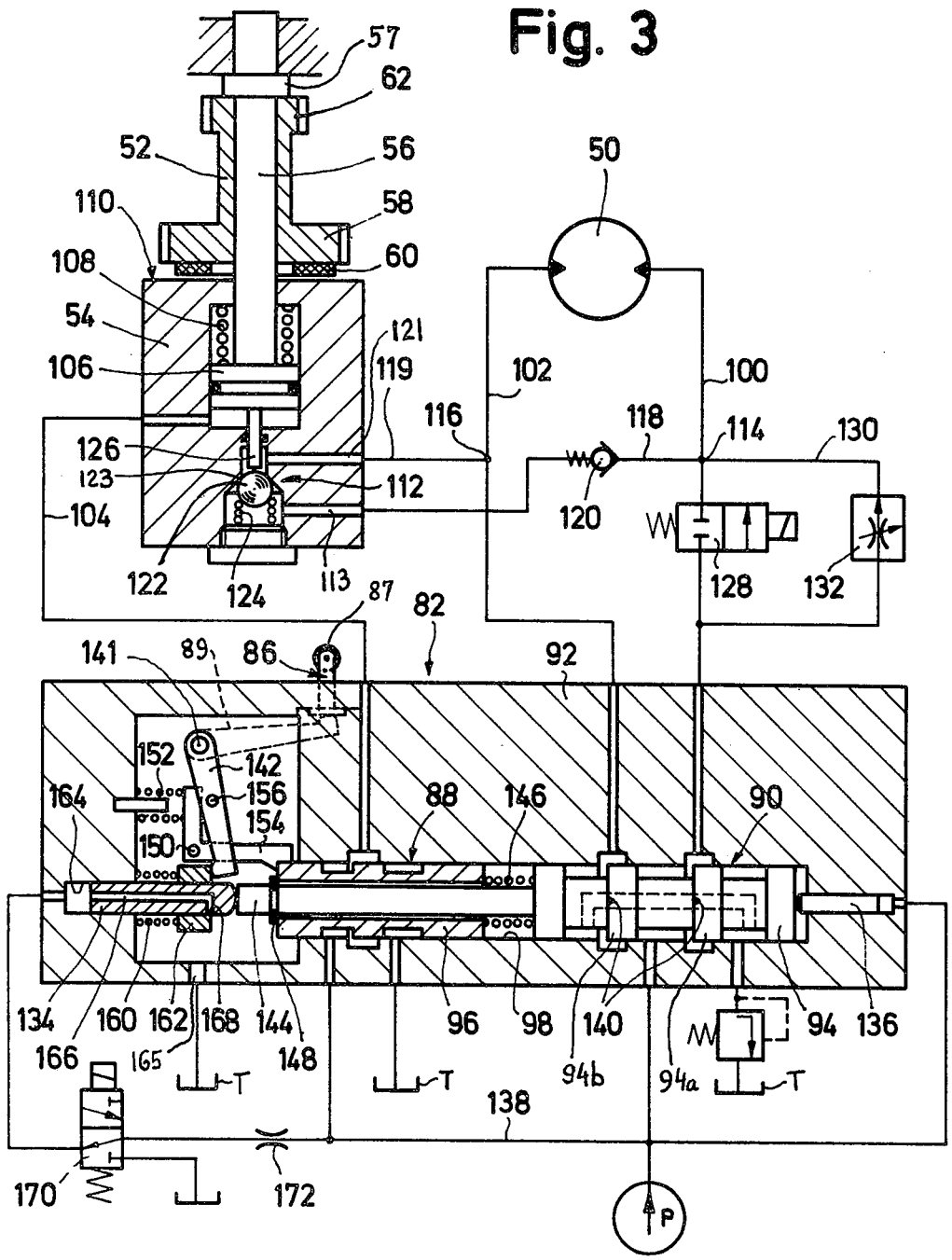
FIG. 3 is a partly diagrammatic and partly sectional view of the motor, braking device and regulating means.

The cam 32 can be rotated by a fluid power motor 50 through the medium of a gear train 52 (see also FIG. 2) rotatably mounted on a shaft 56 which is shiftable axially by a fluid-operated braking device 54 so as to move a brake lining 60 at one end face of a gear 58 of the gear train into frictional engagement with a stationary braking surface 110 shown in FIG. 3. Another gear 62 of the gear train 52 mates with a gear 66 on the shaft 64 of the cam 32. The gear 66 further serves to transmit torque to a rotary programming drum 74 through the medium of intermediate gears 68, 70, 72. The drum 74 has circumferentially extending ribs 76 and grooves 77 for reception and retention of circumferentially adjustable output elements in the form of protuberances or lobes 78 adapted to move displaceable trips 84 of a first stationary regulating unit 80 which controls the operation of one or more attachments for the machine tool.

The output elements or protuberances 78 can further actuate motion receiving input elements or trips 86 of a second stationary regulating unit 82 the details of which are shown in FIG. 3 and which serves to control the flow of hydraulic fluid to and from the motor 50 and braking device 54. The trips 84 of the regulating unit 80 can actuate switches and/or valves (not specifically shown). The input elements or trips 86 serve to indirectly control two valves 88, 90 which are mounted in a common valve housing or body 92 (FIG. 3) and respectively regulate the flow of hydraulic fluid to and from the braking device 54 and motor 50. The valves 88, 90 respectively comprise reciprocable valve members or spools 96, 94 which are installed in an elongated cylindrical bore 98 of the body 92. For the sake of simplicity, the valve 90 will be called motor valve and the valve 88 will be called brake valve.

The motor 50 is connected with the motor valve 90 by a supply conduit 100 for pressurized fluid and a return conduit 102. When the motor valve 90 is open, the supply conduit 100 receives pressurized fluid from a pump P or an analogous source by way of a main supply line 138. The return conduit 102 then communicates with a reservoir or tank T. The connection between the brake valve 88 and the braking device 54 comprises a single connecting conduit 104. As shown in FIG. 3, the aforementioned axially movable shaft 56 which rotatably supports the gear train 52 constitutes the piston rod of a piston 106 which is mounted in a cylinder block of the braking device 54 and is biased by a strong helical spring 108 so that a collar 57 on the shaft or piston rod 56 normally tends to maintain the lining 60 in engagement with the fixed braking surface 110.

The reference character 112 denotes an arresting valve which is a modified ball check valve having a spherical valve member 122 normally bearing against a seat 123 under the action of a valve spring 124. When the arresting valve 112 is open, it allows fluid to flow from the supply conduit 100 to the return conduit 102 and to thus interrupt the operation of hydraulic motor 50. To this end, a junction 114 (e.g., a tee) in the supply conduit 100 is connected with a conduit 118 which contains a one-way ball check valve 120 and is connected with a port 113 of the arresting valve 112. A junction 116 in the return conduit 102 is connected with a conduit 119 which is connected with a second port 121 of the arresting valve 112. When the valve member 122 is lifted off the seat 123 by an extension 126 of the piston 106, pressurized fluid can flow from the supply conduit 100 into the tank T via junction 114, conduit 118, check valve 120, port 113, port 121, conduit 119, junction 116 and return conduit 102. It is clear that the arresting valve 112 need not be installed in the cylinder block of the braking device 54 and that the piston 106 or piston rod 56 can open the valve 112 through the medium of a linkage or the like when the lining 60 is forced against the braking surface 110. All that counts is to insure that the arresting valve 112 opens simultaneously or substantially simultaneously with operation of the braking device 54.

The supply conduit 110 contains a rapid infeed valve 128 which can insure that the carriage 10 is rapidly advanced toward the work spindle 18 during the initial stage of movement of a selected tool on the turret 16 to its operative position. A bypass conduit 130 for the valve 128 contains an adjustable flow restrictor 132.

The resetting means for normally maintaining the spools 94, 96 of the valves 90, 88 in the open positions of FIG. 3 (in which the motor 50 can rotate at a maximum speed and the braking device 54 is inoperative) comprises two hydraulically operated plungers 134, 136. The plunger 136 bears against the outer (right-hand) end of the spool 94, and the plunger 134 bears against a rodlike extension 144 of the spool 94. The extension 144 passes through an axial bore of the spool 96 and carries a split ring 148 or an analogous motion transmitting element which bears against the left-hand end face of the spool 96 to normally maintain the latter in the illustrated position. The plunger 136 is urged against the spool 94 by pressurized fluid which is supplied by the main supply line 138, and the plunger 134 is urged against the extension 144 by fluid which is supplied by the main supply line 138 and passes through a flow restrictor 172 and a switchover valve 170. Since the spool 94 is held in the open position, the main supply line 138 communicates with the supply conduit 100 and the motor 50 drives the gear train 52 to rotate the cam 32 of the advancing apparatus 28. Also, and since the spool 96 is held in the open position, the main supply line 138 communicates with the connecting conduit 104 which admits pressurized fluid into the chamber below the piston 106 of the braking device 54 so that the spring 108 is compressed and the lining 60 does not bear against the stationary braking surface 110. The pressurized fluid is preferably oil.

The construction of the regulating unit 82 is such that the braking device 54 is rendered operative only after the speed of the motor 50 is reduced well below the normal operating speed, i.e., to a so-called crawling speed. In other words, the spool 94 must greatly reduce the flow of pressurized fluid from the main supply line 138 into the supply conduit 100 before the spool 96 can connect the conduit 104 with the tank T in order to allow the spring 108 to expand and to urge the lining 60 against the braking surface 110 to thus arrest the cam 32 in a predetermined angular position corresponding to a selected second position of the carriage 10. The supply conduit 100 invariably receives that quantity of pressurized fluid which is necessary to insure that (in the absence of opening of the arresting valve 112) the motor 50 can be operated at the crawling speed. To this end, the lands 94a, 94b of the spool 94 are formed with suitably configurated notches 140 which allow a small quantity of pressurized fluid to flow from the main supply line 138 into the supply conduit 100 (land 94a) and a small quantity of spent fluid to flow from the return line 102 into the tank T (land 94b) even at such time when the spool 94 is caused to assume its other end position in which, in the absence of notches 140, the conduits 100, 102 would be completely sealed from the main supply line 138 and tank T.

The delayed opening of brake valve 88 is effected in response to angular displacement of a shaft 141 which is turnably mounted in the body 92 and is rigid with the aforementioned motion receiving input elements or trips 86. Each of these trips has a roller follower 87 located in the path of movement of an output element or protuberance 78 on the programming drum 74 and an arm 89 which supports the respective roller follower 87 and is rigid with the shaft 141. The shaft 141 is further rigid with a displacing lever 142 which abuts against the right-hand end face of an annular piston 162 axially movably mounted on the plunger 134. The piston 162 is biased by a spring 160 so that it bears against the lever 142 and biases the latter in a counter-clockwise direction, as viewed in FIG. 3. The spool 96 of the braking valve 88 is biased against the split ring 148 of the extension 144 by a helical spring 146 which reacts against the left-hand end face of the spool 94.

The spool 96 is held against leftward axial movement beyond the illustrated open position by the pallet of a blocking lever 154 which is pivotable in the body 92, as at 150, and is biased clockwise by a helical spring 152. The blocking lever 154 is a bell crank the upwardly extending arm (as viewed in FIG. 3) of which can be engaged and pivoted against the opposition of the spring 152 by a motion transmitting pin 156 of the displacing lever 142. The arrangement is such that the pin 156 begins to pivot the blocking lever 154 after the displacing lever 142 completes a predetermined clockwise angular movement from the starting position of FIG. 3. When the pallet of the blocking lever 154 is disengaged from the spool 96, the latter is free to abruptly move to the other end position (in which the conduit 104 communicates with the tank T) provided that the plunger 134 allows the spring 146 to expand, i.e., that the split ring 148 is spaced apart from the respective end face of the spool 96. The split ring 148 assumes such position after the spool 94 already assumes that end position in which pressurized fluid can enter the supply conduit 100 only through one of the notches 140 (in the land 94a) and spent fluid can leave the conduit 102 by way of the other of the notches 140 (in the land 94b). The blocking lever 154 and the spring 146 constitute parts of a displacing device for the spool 96; this displacing device causes the valve 88 to operate the braking device 54 with a delay following the movement of a trip 86, namely when the speed of the motor 50 has been reduced to crawling speed.

The manner in which the spool 94 is moved to its left-hand end position (in which the split ring 148 is initially spaced apart from the spool 96) is as follows: The plungers 134, 136 normally bear against the respective ends of the spool 94 under the action of pressurized fluid in the main supply line 138. Thus, the plunger 136 bears directly against the right-hand end face of the spool 94 and the plunger 134 bears against the adjacent end face of the extension 144. Since the shifting of spool 94 to its illustrated right-hand end position necessitates a rightward axial movement of the plunger 134 against the opposition of the plunger 136, the cross-sectional area of the plunger 134 exceeds (and is assumed to be twice) that of the plunger 136. The chamber at the left-hand end of the larger-diameter plunger 134 is shown at 164; this chamber can be connected with the tank T by way of a bore or channel 166 which is machined into the plunger 134 and the radially extending right-hand end portion of which is controlled by the cylindrical internal surface 168 of the aforementioned annular piston 162. This piston 162 forms with the plunger 134 an adjustable throttling device which regulates the flow of pressurized fluid from the chamber 164 into the tank T (through an outlet port 165 in the body 92). The throttling device 134, 162 is adjustable by the displacing lever 142 which, as stated above, abuts against the righthand end face of the piston 162. When a motion receiving trip 86 is engaged and displaced by the corresponding output element or protuberance 78 of the programming drum 74, the trip 86 turns the shaft 141 clockwise, as viewed in FIG. 3, and pivots the displacing lever 142 in the same direction so that the internal surface 168 of the piston 162 slides along the peripheral surface of the plunger 134 and allows pressurized fluid to flow from the chamber 164 into the port 165. The pressure of fluid in the chamber 164 drops so that the plunger 136 can move the spool 94 in a direction to the left, as viewed in FIG. 3, whereby the split ring 148 on the extension 144 moves away from the spool 96 because the latter is still held by the blocking lever 154. Such axial movement of the spool 94 stresses the spring 146 between the spools 94, 96. When the pin 156 thereupon disengages the blocking lever 154 from the spool 96, the spring 146 dissipates a substantial amount of energy so that the spool 96 is abruptly propelled to its left-hand end position in which the conduit 104 communicates with the tank T and the spring 108 urges the lining 60 against the braking surface 110.

It will be seen that each trip 86 can bring about a stoppage of the motor 50 and carriage 10 because each of these trips is rigid with the shaft 141 and displacing lever 142 so that the latter causes the blocking lever 154 to become disengaged from the spool 96 whenever a protuberance 78 on the programming drum 74 engages and displaces a trip 86. Of course, the distribution of protuberances 78 on the drum 74 is such that the carriage 10 is normally arrested at different distances from the work spindle 18, i.e, at distances which are necessary for proper treatment of the workpiece 20 by the respective tools on the turret 16.

That protuberance 78 which has engaged the corresponding trip 86 and has caused a stoppage of the motor 50 and carriage 10 can be disengaged from the respective trip 86 in response to appropriate control signals (the means for producing such signals is not shown). The signals can be produced by the main programming unit of the machine tool.

The purpose of the switchover valve 170 in the connection between the main supply line 138 and the chamber 164 for the plunger 134 is to allow for changes in the direction of movement of the carriage 10 independently of the braking device 54. This is desirable, for example, to facilitate a change in setup and/or to allow for removal of shavings from deep bores in a workpiece.

In accordance with another feature of the invention, the power train between the camshaft 64 (gear 66 of the gear train 52) and the programming drum 74 is preferably selected in such a way that the number of teeth on the gears which receive motion from the gear 66 and rotate the drum 74 is a whole multiple of the total number of teeth on the gears of the gear train 52. This insures that the drum 74 can be rotated through angles of optimum magnitude with a very high degree of accuracy, even after at least some of the gears have undergone a certain amount of wear. Moreover, eventual deviations of the configuration of one or more gears between the output shaft 51 of the hydraulic motor 50 and the shaft 7 of the drum 74 cannot unduly affect the reproducibility with which the drum 74 can be caused to assume a predetermined number of selected angular positions.

The operation:

In the position which is shown in FIG. 3, the spool 94 of the motor valve 90 allows practically unobstructed flow of fluid from the main supply line 138 into the supply conduit 100 and practically unobstructed flow of spent fluid from the return conduit 102 into the tank T. At the same time, the spool 96 of the brake valve 88 allows pressurized fluid to flow from the main supply line 138 into the conduit 104 and into the chamber below the piston 106 of the braking device 54. Thus, the lining 60 is spaced apart from the braking surface 110 and the braking device does not interfere with rotation of the motor 50 at normal speed. The spools 94, 96 are held in the positions of FIG. 3 by plungers 134, 136 and spring 146. The pallet of the blocking lever 154 abuts against the left-hand end face of the spool 96 under the action of the spring 152 because the spring 160 maintains the displacing lever 142 in the illustrated starting position through the medium of the annular piston 162.

When one of the protuberances 78 on the rotating programming drum 74 engages and displaces the corresponding trip 86, the displacing lever 142 pivots clockwise, as viewed in FIG. 3, and shifts the piston 162 axially of the plunger 134. This increases the rate of flow of pressurized fluid from the chamber 164 into the port 165 and tank T thereby the pressure of fluid in the chamber 164 drops and the plunger 136 can shift the spool 94 in a direction to the left to stress the spring 146, to move the split ring 148 away from the left-hand end face of the spool 96, and to greatly reduce the rate of fluid flow from the main supply line 138 into the supply conduit 100 and from the return conduit 102 to the tank T. The inclination of the ramp 79 of each protuberance 78 and the dimensions of the notches 140 are selected in such a way that the speed of the hydraulic motor 50 decreases rapidly but in accordance with a preselected optimum pattern. The motor 50 continues to rotate at a much lower speed so that the carriage 10 crawls toward the selected second position.

All this takes place before the pin 156 of the displacing lever 142 begins to pivot the blocking lever 154 against the opposition of the spring 152, i.e., before the spool 96 of the brake valve 88 is permitted to leave the position of FIG. 3. As soon as the pallet of the blocking lever 154 is disengaged from the spool 96, the latter is abruptly propelled against the split ring 148 under the action of the spring 146 (which has been stressed during leftward movement of the spool 94 under the action of the plunger 136). This causes the spool 96 to connect the conduit 104 with the tank T so that the spring 108 is free to move the piston 106 downwardly, as viewed in FIG. 3, and to move the lining 60 into frictional engagement with the stationary braking surface 110.

The movement of lining 60 against the braking surface 110 takes place simultaneously with opening of the valve 112 by the extension 126 of the piston 106. This allows the small amount of pressurized fluid which continues to flow through the supply conduit 102 (see the notch 140 in the land 94a of the spool 94) to bypass the motor 50 so that the latter is arrested simultaneously with the application of a pronounced braking force. The pressurized fluid flows from the junction 114, through the conduit 118, check valve 120, port 113, valve 112, port 121, conduit 119, junction 116, return conduit 102, and to the tank T.

The establishment of a direct connection between the conduits 100 and 102 when the motor 50 is at a standstill is desirable in order to avoid abrupt starting of the motor when the braking device 54 is disengaged in response to return movement of the spool 96 to the position of FIG. 3. This insures that, when the advancing apparatus 28 is operated again to move the carriage 10 toward the work spindle 18, the carriage 10 begins to move without any jerking.

The adjustable flow restrictor 132 (which is invariably installed in the supply conduit 100) produces the negative effect that, when subjected to maximum fluid pressure by fluid flowing in the bypass conduit 130, it can also cause an abrupt starting of the motor 50. Therefore, the valves 88, 90 are designed in such a way that such abrupt flow of fluid through the conduit 130 cannot have any adverse effects. To this end, the spool 94 allows fluid to flow from the main supply line to the bypass conduit at full pressure before the braking device 54 is deactivated in spite of the fact that the spools 94, 96 simultaneously move back to the position shown in FIG. 3. Consequently, the valve 112 remains open while there develops a surge of pressurized fluid which passes through the motor valve 90 and flow restrictor 132. The pressurized fluid can flow from the conduit 100 into the conduit 102 through the still open arresting valve 112. Consequently, the starting of the motor 50 takes place gradually.

Once the spools 94, 96 reassume the positions shown in FIG. 3, the blocking lever 154 is free to pivot under the action of the spring 152 and thereby holds the spool 96 against axial movement toward the plunger 134.

The biasing means 26 returns the carriage 10 to its fully retracted position (in which the extension 11 abuts against the stop 30) before the apparatus 28 is actuated again to move the carriage forwardly subsequent to indexing of the turret 16 and support 36 to a different angular position.

An important advantage of the improved advancing apparatus is that it comprises a single hydraulic motor and that, even when the flow of pressurized fluid from the source P, 138 is throttled to a maximum extent (notch 140 in the land 94a), i.e., when the RPM of the output shaft 51 is low, the motor is still capable of supplying the necessary torque to rotate the cam 32 against the opposition of the biasing means and/or other resistance which the carriage 10 encounters while the cam 32 is in motion. Such construction renders it possible to achieve an optimum deceleration of the carriage 10 to zero speed as well as to abruptly arrest the carriage in a selected second position while the RPM of the output shaft 51 is very low.

Another important advantage of the apparatus 28 is that, and as already mentioned hereinabove, its components are capable of effecting a gradual acceleration of the motor 50 in spite of the fact that the spool 94 can rapidly reassume the (first) position which is shown in FIG. 3., i.e., in spite of the fact that the spool 94 abruptly increases the rate of flow of pressurized fluid from the main supply line 138 to the conduit 100. This is due to the provision of notches 140 which permit a certain amount of fluid to flow between the line 138 and conduit 100 on the one hand and the conduit 102 and tank T on the other hand while the spool 94 is held in the left-hand end position, and also to the provision of valve 112 which remains open for a while after the spool 94 begins to move to the position of FIG. 3. Consequently, the motor 50 cannot undergo abrupt acceleration which would suffice to cause breakage of a tool which engages the workpiece during disengagement of the braking device 54. Also, the fact that the flow restrictor 132 receives fluid at maximum pressure before the braking device 54 is disengaged cannot cause an abrupt acceleration of the motor 50 because the valve 112 is still open at the time the spool 94 again allows the fluid to flow at a maximum rate from the main supply line 138 to the branch conduit 130.

The placing of spools 94, 96 into a common bore (98) of the body 92 contributes to compactness of the regulating unit 82 which can be installed in the frame of the machine tool whereby the body 92 confines all or nearly all parts of the displacing and restoring means for the two spools.

Without further analysis, the foregoing will so fully reveal the gist of the present invention that others can by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In a machine tool, a combination comprising a support; a carriage reciprocable along said support from a first position to one of a plurality of second positions; means for biasing said carriage to said first position; and apparatus for advancing said carriage to a selected second position, comprising a movable cam, follower means tracking said cam and arranged to move said carriage from said first position in response to movement of said cam from a starting position, a rotary hydraulic motor operable at a plurality of speeds, a source of pressurized hydraulic fluid, a reservoir, a first conduit for connecting said source with said motor, a second conduit for connecting said motor with said reservoir, means for moving said cam in response to rotation of said motor, a hydraulic braking device for arresting said cam in a selected second position of said carriage, a programming device receiving motion from said motor and having a plurality of output elements, and regulating means including a plurality of mobile input elements each arranged to receive motion from a different one of said output elements in respective preselected positions of said programming device, each of said angular positions corresponding to a second position of said carriage, said regulating means further including first and second valves for respectively controlling the speed of said motor and the operation of said braking device, said first valve being installed in said conduits, first displacing means movable in response to movement of any one of said input elements to thereby actuate said first valve so as to reduce the speed of said motor, second displacing means for actuating said second valve with a delay following the movement of any one of said input elements to thereby operate said braking device while said motor rotates at reduced speed, means for arresting said motor substantially simultaneously with operation of said braking device, said arresting means comprising a normally closed third valve connected between said conduits and means for opening said third valve in response to operation of said braking device, and fluid-operated resetting means for normally maintaining said first and second valves in conditions corresponding to an elevated speed of said motor and inoperative condition of said braking device.

2. A combination as defined in claim 1, wherein said machine tool is an automatic lathe having a rotary tool turret mounted on and indexible with respect to said carriage, and further comprising a plurality of projections provided on said carriage and indexible in response to indexing of said turret so that a different one of said projections can receive motion from said follower means and transmit such motion to said carriage in each angular position of said turret.

3. A combination as defined in claim 1, wherein said first displacing means comprises a lever which is pivotable by said input elements.

4. A combination as defined in claim 1, wherein said resetting means comprises a member arranged to reset said first valve to said condition corresponding to said elevated speed of said motor while said second valve still maintains said braking device in operative condition and while said third valve is open.

5. A combination as defined in claim 4, wherein said first and second valves respectively comprise reciprocable first and second valve members and said regulating means further comprises a common valve body for said valve members.

6. A combination as defined in claim 5, wherein said first displacing means comprises a lever which is pivotable by said input elements to thereby effect a movement of said first valve member from a first position in which said source supplies pressurized fluid to said first conduit at a higher first rate to a second position in which said rate is reduced to a lower second rate to thereby reduce the speed of said motor.

7. A combination as defined in claim 5, wherein said first valve member is coaxial with said second valve member, said body having a bore for said valve members and said resetting means further comprising a plunger which is subjected to the action of said pressurized fluid to move said first valve member to said second position in response to movement of said first displacing means as a result of movement of any one of said input elements.

8. A combination as defined in claim 7, wherein said second displacing means comprises resilient means for biasing said second valve member from a first position corresponding to inoperative condition of said braking device to a second position in which said braking device is operative to arrest said cam.

9. A combination as defined in claim 8, wherein said resilient means reacts against said first valve member and said first valve member comprises an extension passing lengthwise through said second valve member and abutting against said member of said resetting means, said last mentioned member constituting a second plunger which is biased against said extension by pressurized fluid supplied by said source.

10. A combination as defined in claim 9, wherein said extension comprises means for returning said second valve member to said first position in response to movement of said first valve member to said first position thereof under the action of said second plunger.

11. A combination as defined in claim 10, wherein said body defines a chamber connected with said source and being adjacent to that end of said second plunger which is remote from said extension, said body further having an outlet connected with said reservoir and said second plunger having a channel connecting said chamber with said outlet, said second displacing means further comprising an adjustable throttling device for the flow of fluid from said chamber to said outlet.

12. A combination as defined in claim 11, wherein said second displacing means further comprises a blocking member arranged to normally hold said second valve member in said first position thereof, said first displacing means including means for adjusting said throttling device so as to increase the rate of flow of fluid from said chamber to said outlet and to thus permit the movement of said first valve member to said second position thereof under the action of said first mentioned plunger and means for disengaging said blocking member from said second valve member subsequent to adjustment of said throttling device to thereby enable said resilient means to move said second valve member to said second position.

13. A combination as defined in claim 11, wherein the cross-sectional area of said second plunger exceeds the cross-sectional area of said first mentioned plunger.

14. A combination as defined in claim 13, wherein said throttling device comprises an annular piston surrounding said second plunger and movable axially thereof, and means for biasing said piston to a position in which said piston reduces the rate of fluid flow from said chamber to said outlet.

15. A combination as defined in claim 1, wherein said braking device comprises a cylinder block, a piston reciprocably mounted in said cylinder block, and resilient means for biasing said piston to a first position in which said braking device is operative to arrest said cam, said second valve having a valve member movable between first and second positions to thereby connect said block with said source of pressurized fluid whereby the fluid moves said piston to a second position corresponding to inoperative condition of said braking device.

16. In a machine tool, a combination comprising a support, a carriage reciprocable along said support from a first position to one of a plurality of second positions; means for biasing said carriage to said first position; and apparatus for advancing said carriage to a selected second position, comprising a movable cam, follower means tracking said cam and arranged to move said carriage from said first position in response to movement of said cam from a starting position, a rotary fluid power motor operable at a plurality of speeds, means for moving said cam in response to rotation of said motor, a fluid-operated braking device for arresting said cam in a selected second position of said carriage, a programming device receiving motion from said motor and having a plurality of output elements, and regulating means including a plurality of mobile input elements each arranged to receive motion from a different one of said output elements in respective preselected positions of said programming device, each of said angular positions corresponding to a second position of said carriage, said regulating means further including first and second valves for respectively controlling the speed of said motor and the operation of said braking device, first displacing means movable in response to movement of any one of said input elements to thereby actuate said first valve so as to reduce the speed of said motor, second displacing means for actuating said second valve with a delay following the movement of any one of said input elements to thereby operate said braking device while said motor rotates at reduced speed, means for arresting said motor substantially simultaneously with operation of said braking devices, and fluid-operated resetting means for normally maintaining said valves in conditions corresponding to an elevated speed of said motor and inoperative condition of said braking device, said braking device comprising means for actuating said arresting means so that said arresting means stops said motor in response to operation of said braking device.

17. A combination as defined in claim 16, wherein said motor is a hydraulic motor and said braking device is operated by hydraulic fluid.

18. In a machine tool, a combination comprising a support; a carriage reciprocable along said support from a first position to one of a plurality of second positions; means for biasing said carriage to said first position; and apparatus for advancing said carriage to a selected second position, comprising a movable cam, follower means tracking said cam and arranged to move said carriage from said first position in response to movement of said cam from a starting position, a rotary fluid power motor operable at a plurality of speeds, means for moving said cam in response to rotation of said motor, a fluid-operated braking device for arresting said cam in a selected second position of said carriage, said braking device comprising a cylinder block, a piston reciprocably mounted in said cylinder block and resilient means for biasing said piston to a first position in which said braking device is operative to arrest said cam, a programming device receiving motion from said motor and having a plurality of output elements and regulating means including a plurality of mobile input elements each arranged to receive motion from a different one of said output elements in respective preselected positions of said programming device, each of said angular positions corresponding to a second position of said carriage, said regulating means further including first and second valves for respectively controlling the speed of said motor and the operation of said braking device, said second valve having a valve member movable between first and second positions to thereby connect said block with a source of pressurized fluid whereby the fluid moves said piston to a second position corresponding to inoperative condition of said braking device, first displacing means movable in response to movement of any one of said input elements to thereby actuate said first valve so as to reduce the speed of said motor, second displacing means for actuating said second valve with a delay following the movement of any one of said input elements to thereby operate said braking device while said motor rotates at reduced speed, means for arresting said motor substantially simultaneously with operation of said braking device, fluidoperated resetting means for normally maintaining said valves in conditions corresponding to an elevated speed of said motor in inoperative condition of said braking device, a first conduit arranged to admit pressurized fluid to said motor and a second conduit arranged to receive spent fluid from said motor, said arresting means comprising a normally closed third valve connected between said conduits and said piston comprising means for opening said third valve in said first position thereof.

19. A combination as defined in claim 18, wherein said third valve comprises a seat, a spherical valve member, and means for biasing said spherical valve member against said seat whereby said third valve seals said first and second conduits from each other, said opening means comprising an extension provided on said piston and arranged to move said spherical valve member away from said seat in response to movement of said piston to said first position thereof.

20. A combination as defined in claim 18, wherein said third valve is installed in said cylinder block.

* * * * *